United States Patent Office 3,278,607
Patented Oct. 11, 1966

3,278,607
PROCESS FOR THE PRODUCTION OF 1,1-DIMETHYLOL-Δ³-CYCLOHEXENE
Theodor Lussling, Hanau am Main, Germany, assignor to Deutsche Gold- und Silber-Scheideanstalt vormals Roessler, Frankfurt am Main, Germany
No Drawing. Filed Oct. 4, 1962, Ser. No. 228,241
Claims priority, application Germany, Oct. 25, 1961, D 37,307
4 Claims. (Cl. 260—617)

The present invention relates to an improved process for the production of 1,1-dimethylol-Δ³-cyclohexene starting from tetrahydrobenzaldehyde.

1,1-dimethylol-Δ³-cyclohexene is a valuable material for the production of epoxy resins. It can be prepared from tetrahydrobenzaldehyde according to the following reaction scheme:

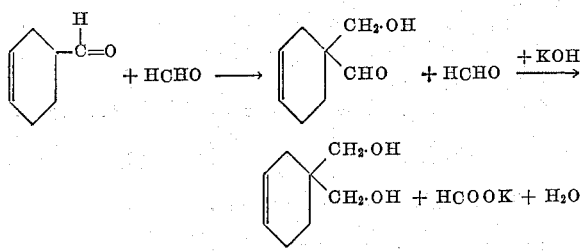

According to French & Gallagher (J. Am. Chem. Soc. 64, page 1498, 1942), the reactions are carried out as a type of one step process using formalin and KOH employing methanol as a solvent to be able to work in a homogeneous phase. The reaction product is recovered from the reaction solution, after dilution with water, by extraction with ether and recrystallized from petroleum ether. The yield is between 50 and 60% of the theoretical.

When this process is carried out on a technical scale the ether extraction is disturbing and attempts have been made to avoid such extraction because of the dangers involved. Investigations in this direction showed that the ether could not be replaced as extraction agent with the less dangerous benzene and still obtain the same results. Thereupon, the reaction solution was cooled down to recover the main quantity of 1,1-dimethylol-Δ³-cyclohexene by crystallization. However, substantial quantities thereof were still retained in the mother liquor which then had to be extracted with ether. When attempts were made to distill the reaction product recovered in the crystallization under vacuum, considerable quantities of Δ³-tetrahydrobenzyl alcohol were obtained as a by-product and considerable non-distillable residue remained. The same manifestations were also observed when about 1% of phosphoric acid was added to the melted crude product before the vacuum distillation in order to neutralize the excess alkali carried along therewith. The yield in this instance was 65.6% of the theoretical. When the neutralization with phosphoric acid was effected before crystallization of the crude product, that is, in the reaction solution, no dimethylolcyclohexene at all could be obtained upon vacuum distillation of the crystallized mass. The distillation residue in this instance was 90.4%.

According to the invention it was unexpectedly found that pure 1,1-dimethylol-Δ³-cyclohexene could be produced from tetrahydrobenzaldehyde, formaldehyde and alkalies capable of catalysing the crossed Cannizzaro reaction, preferably an alkali metal hydroxide, in good yields and without requiring extractive steps if the reaction is carried out in an aqueous emulsion at raised temperatures employing 1.0 to 1.1 mol of alkali based on the tetrahydrobenzaldehyde, the reaction product crystallized out, dried and vacuum distilled. Very unexpectedly the dried crystallized reaction product obtained according to the process of the invention can be subjected directly to vacuum distillation, that is, without previous neutralization or purification, without incidence of the above-mentioned decomposition products and without formation of large residues. The reaction product is obtained in a yield of more than 90% of the theoretical.

The alkali employed according to the invention expediently is either sodium or potassium hydroxide but as is self-understood other alkalies which catalyse the "crossed" Cannizzaro reaction can also be used.

Expediently the reaction is carried out at temperatures between 50 and 110° C., preferably at the boiling point of the reaction mixture at atmospheric pressure. In general, it is advantageous to add the alkali at a lower temperature, for example, between about 50 and 80° C., and only heating the reaction mixture to boiling after such addition. As the reaction is carried out in an aqueous emulsion not only formalin but also paraformaldehyde can be employed as the formaldehyde component as the latter forms monomeric formaldehyde in the presence of the alkali.

As the reaction according to the invention is carried out in aqueous emulsion it is possible to employ higher temperatures (over 100° C.) without the necessity of employing superatmospheric pressures. It was found that such higher temperatures lead to better results within the same reaction periods. Operation in solution as in French & Gallagher with additions of methanol only permits reaction temperatures of about 70–80° C.

It is expedient for the process according to the invention that as fine a distribution of the water insoluble aldehyde as possible is provided and for this purpose it is advantageous to employ 1 to 5% by weight of a normal commercial emulsifier, wetting agent or stabilizer which may be of ionic or non-ionic nature, such as, for example, Turkey red oil, soaps of fatty acids or resin acids, alkyl aryl sulfonates, secondary alkyl sulfates, polyethylene ethers of fatty alcohols, fatty acids or fatty amines, lignin sulfonic acids, saponin, gelatine, casein and the like.

In carrying out the process according to the invention it is best first to emulsify the tetrahydrobenzaldehyde together with the formaldehyde and the emulsifier in water by vigorous stirring and thereafter adding the alkali gradually either in solid form or as a solution while cooling lightly so that the temperature does not rise above 80° C. Thereafter the mixture is heated to boiling and after completion of the reaction cooling the mixture to crystallize out the reaction product, separating such crystallized reaction product, drying it and distilling it under vacuum.

The tests, the results of which are tabulated in the table given below will illustrate the process according to the invention.

The tetrahydrobenzaldehyde (distilled about 99.6% pure), the formaldehyde (as paraformaldehyde or 28% formalin), the emulsifier (Na-diisobutyl naphthalene sulfonate) and if necessary a corresponding amount of water were introduced into the stirring vessel and emulsified with vigorous stirring. Then technical potassium hydroxide either as a solid or about a 60% solution was added over a period of about ¾ hour so that the temperature of the reaction mixture remained about 70° C. except in the last test. The reaction mixture was thereafter heated to boiling for 1 hour, then withdrawn and cooled as quickly as possible to room temperature while stirring. The crude 1,1-dimethylol-Δ³-cyclohexene crystallized out contaminated with a little potassium formate. It was centrifuged off, dried and distilled at 115° C. under a pressure of 0.4 mm. Hg.

Table

| Test No. | T.H.B. 99.6% | Quantity supplied in g. | | | Emul- sifier | React. Bed./Temp. | | Crude prod., g. | Distillate 1,1-dimethylol-Δ³-cyclohexene | | Dest. residue, g. |
|---|---|---|---|---|---|---|---|---|---|---|---|
| | | HCHO absol. | KOH | Water total | | ¾ hr. at °C. | 1 hr. at °C. | | g. | Percent of Th. | |
| 1 | 110.2 | 60.2 | 61.7 | 184.8 | 1.0 | 70 | 104 | 147.0 | 124.0 | 87.20 | 21.0 |
| 2 | 110.2 | ¹60.0 | 61.7 | 188.5 | 1.0 | 70 | 104 | 151.0 | 129.0 | 90.72 | 21.0 |
| 3 | 330.6 | 198.2 | ²202.0 | 509.8 | 3.0 | 70 | 104 | 450.0 | 370.0 | 86.70 | 80.0 |
| 4 | 1,653.0 | 964.4 | 1,010.0 | 2,973.6 | 15.0 | 70 | 104 | 2,267.0 | 1,948.0 | 91.28 | 196.0 |
| 5 | 1,653.0 | 964.4 | 1,010.0 | 2,973.6 | 15.0 | | 104-108 | 2,164.0 | 1,900.0 | 89.04 | 225.0 |

¹ Paraformaldehyde (94.5%).  ² Solid KOH.

I claim:

1. A process for the production of 1,1-dimethylol-Δ³-cyclohexene which comprises reacting tetrahydrobenzaldehyde in the form of an aqueous emulsion with formaldehyde in the presence of 1 to 1.1 mol of an alkali selected from the group consisting of sodium hydroxide and potassium hydroxide with reference to the tetrahydrobenzaldehyde at a temperature between 50 and 110° C., crystallizing the reaction product from the aqueous reaction mixture, drying the crystallized reaction product and distilling it under vacuum.

2. The process of claim 1 in which said reaction is carried out at atmospheric pressure at the boiling point of the aqueous emulsion.

3. The process of claim 1 in which the formaldehyde is supplied as paraformaldehyde.

4. A process for the production of 1,1-dimethylol-Δ³-cyclohexene which comprises forming an aqueous emulsion of tetrahydrobenzaldehyde containing formaldehyde in the presence of 1 to 5% by weight of an emulsifier, incorporating 1 to 1.1 mol of an alkali selected from the group consisting of sodium hydroxide and potassium hydroxide in said emulsion at a temperature up to 80° C., then heating said emulsion to boiling at atmospheric pressure to effect reaction between the tetrahydrobenzaldehyde and the formaldehyde.

References Cited by the Examiner

Becher: Emulsions, p. 272 (1957).

French et al.: J. Am. Chem. Soc., vol. 64 (1942), p. 1498.

Bennett: Practical Emulsions, p. 59 (1947).

LEON ZITVER, Primary Examiner.

M. B. ROBERTO, T. G. DILLAHUNTY, Assistant Examiners.